July 16, 1968  T. A. BARR, JR., ET AL  3,392,577
REAL TIME REENTRY SIMULATOR
Filed Feb. 3, 1966  3 Sheets-Sheet 1
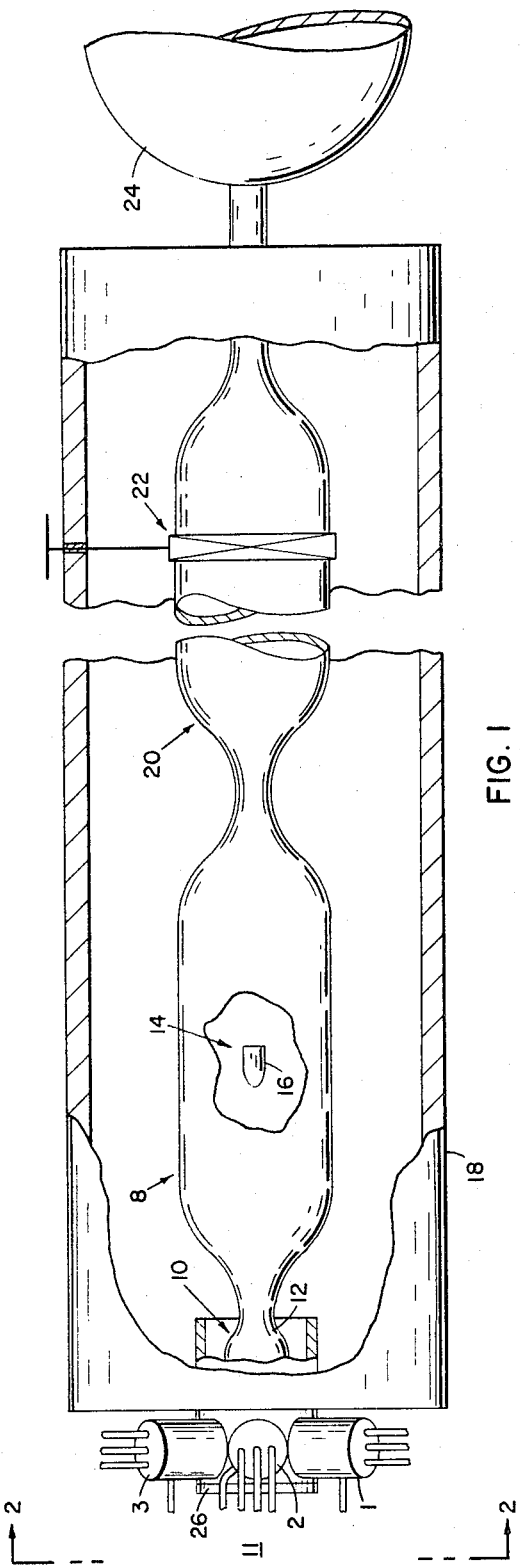
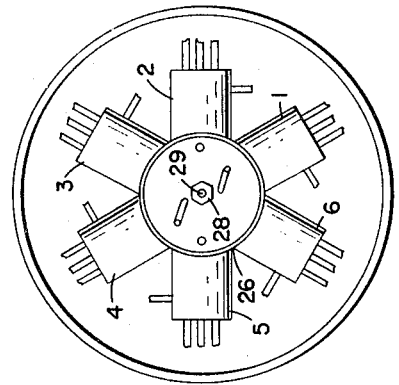
THOMAS A. BARR JR.
CHARLES M. CASON
ROBERT F. MAYO
LOREN L. DICKERSON
JOHN J. EHRLICH
JAMES F. PERKINS
RAYMOND A. BRANDT
BILLIE O. ROGERS,
    INVENTORS.
BY Harry M. Saragovitz
   Edward J. Kelly
   Herbert Berl
   Robert C. Sims July 16, 1968 T. A. BARR, JR., ET AL 3,392,577
REAL TIME REENTRY SIMULATOR
Filed Feb. 3, 1966 3 Sheets-Sheet 2

THOMAS A. BARR JR.
CHARLES M. CASON
ROBERT F. MAYO
LOREN L. DICKERSON
JOHN J. EHRLICH
JAMES F. PERKINS
RAYMOND A. BRANDT
BILLIE O. ROGERS,
INVENTORS.

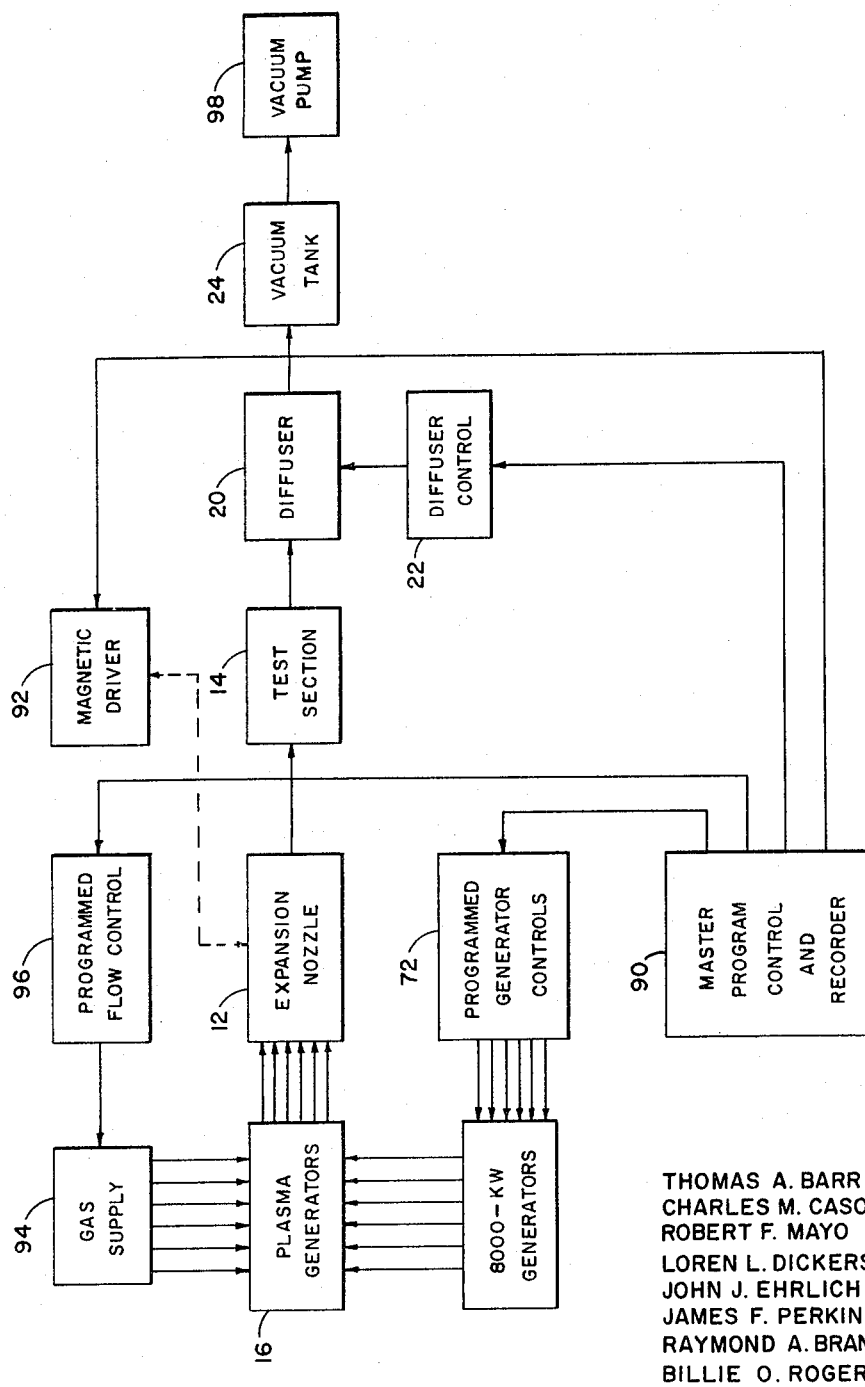

United States Patent Office 3,392,577
Patented July 16, 1968

3,392,577
REAL TIME REENTRY SIMULATOR
Thomas A. Barr, Jr., Charles M. Cason, Robert F. Mayo, Loren L. Dickerson, John J. Ehrlich, James F. Perkins, Raymond A. Brandt, and Billie O. Rogers, Huntsville, Ala., assignors to the United States of America as represented by the Secretary of the Army
Filed Feb. 3, 1966, Ser. No. 525,799
6 Claims. (Cl. 73—147)

ABSTRACT OF THE DISCLOSURE

A computer controlled space reentry simulator wherein a gas flow passes through plasma generators and an expansion system into a test chamber to attain the proper density, velocity and temperature for real time reentry model testing. The gas flow, plasma generators and expansion system are controlled by an analog computer to simulate realtime reentry conditions within the test chamber.

---

The invention described herein may be manufactured and used by or for the Government for governmental purposes without the payment of any royalty thereon.

The invention relates generally to simulation of the conditions of reentry of a body, such as nose cone, under real reentry flight times. Specifically, this invention relates to a hyperthermal arc driven wind tunnel having a plurality of plasma generators which produce a flow field with real time varying parameters such as free stream density, pressure, velocity, and enthalpy.

It has been a problem to test in the laboratory materials and shapes under reentry conditions. Heretofore, attempts have been made to provide space reentry simulating conditions by various methods such as the use of shock waves, hot-shots, and other similar heat producing devices. These wind tunnel devices operate at fixed "free stream conditions" for a given length of time, and in order to get a trajectory, a number of fixed point operations are required. Since a number of operations are required, one is working on a cool body at the start of each point and a true reentry condition cannot be had. Further, there is a need to determine ablation rates, stability, and wake properties as though the test vehicle is actually reentering the atmosphere under real time. Obviously, a simulator which operates only at fixed "free stream condition" can not produce real time conditions.

Of the many methods for producing high altitude, high velocity conditions, only the hyperthermal (arc driven) wind tunnel offers true simulation of all important parameters: enthalpy, velocity, altitude, test time, and model size. The general requirements of a reentry simulator may be described as follows:

(1) There must be a mechanism for heating and/or driving a gas stream.

(2) The gas stream must be either at a very high velocity or at a very high temperature or both.

(3) The gas stream size, shape, and direction must be controlled. Ideally, the mechanisms which affect these conditions should be independently adjustable.

It is an object of the invention to provide a reentry simulator for nose cones and the like.

A further object of the present invention is to provide a reentry simulator to determine ablation rates, stability, and wake properties of a test body.

A still further object of this invention is to provide a reentry simulator which operates in real time with varying parameters.

The simulator brings about these objects by the use of an analog computer which is programmed to follow a particular reentry. The computer controls the main excitation fields of a group—six—D.C. generator sets. These generators each power a separate plasma generator which in turn heats the air supplied to them as the air passes through electric arcs. From here the air of time varying mass flow rate passes into the common plenum—fed by six plasma generators—through the supersonic nozzle into the test section. A model in the test section undergoes testing as if it were making an altitude transition under the programmed real time. Typical conditions are simulated continuously between 400,000 to 50,000 feet altitude.

The invention further resides in and is characterized by various novel features of construction, combinations, and arrangements of parts which are pointed out with particularity in the claims annexed to and forming a part of this specification. Complete understanding of the invention and an introduction to other objects and features not specifically mentioned will be apparent to those skilled in the art to which it pertains when reference is made to the following detailed description of a specific embodiment thereof and read in conjunction with the appended drawing. The drawing, which forms a part of the specification, presents the same reference characters to represent corresponding and like parts throughout the drawing, and wherein:

FIGURE 1 is a diagrammatic representation of a preferred form of the invention;

FIGURE 2 is a front view of FIGURE 1 along lines 2—2;

FIGURE 5 is a functional block diagram of the invention.

Figure 3:
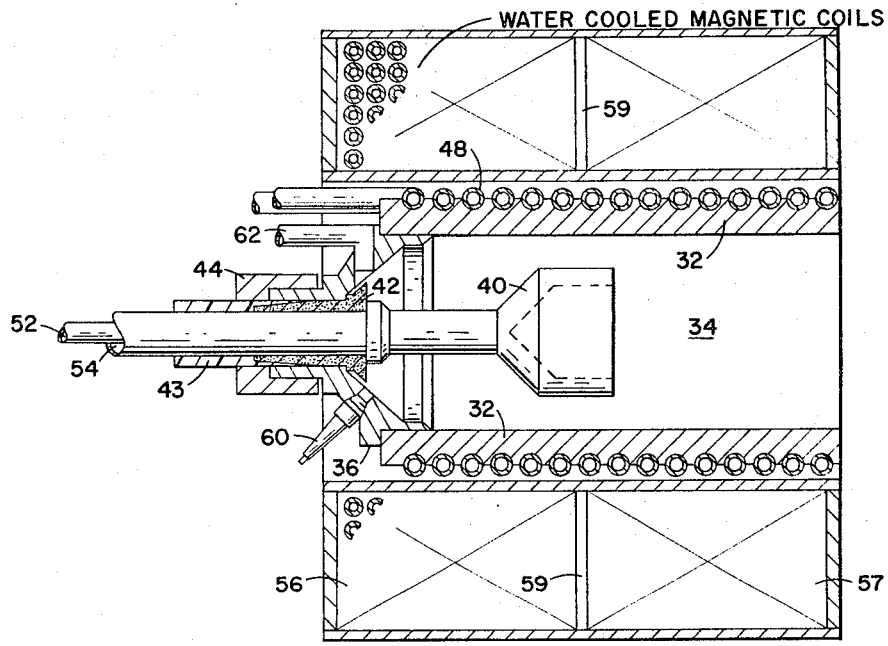
FIGURE 3 is an enlarged and greater detailed view of a plasma generator used in the present invention.

The reentry simulator will have its gas flow rate and electric power supplied in a controlled and continuously varying program. It will employ high current arc heaters (plasma generators) for the air. The heated air will be passed through an expansion system to attain the proper density and velocity for reentry model testing. Environmental conditions comparable to those between the altitudes of 120,000 meters (about 400,000 ft.) and 15,000 meters (about 50,000 ft.) are to be obtained. Gas velocity will be controlled by control of heat input from the arc and gas density by control of air flow through the arc. For a fixed expansion ratio, both gas density and velocity can be varied over the range of interest. The exact altitude ranges are determined by the particular nozzle used. Simulation within the above limits is considered adequate if constant enthalpy conditions are assumed. Constant enthalpy implies a constant descent velocity, and this is adequate for simulation in the altitude regime to be considered. This condition, in turn, requires an exponentially increasing gas flow and power program to simulate the constantly decreasing altitude of a missile reentering or entering the earth's atmosphere. Of course, the same holds true for most planets having an atmosphere. The actual property being simulated, such as stagnation zone heating or side-on heating of the missile, governs the equivalent range over which simulation occurs.

A simulator using only one plasma generator was made, and it showed an important, but expected, non-uniformity of gas flow. This assembly had an inherent fault in that at the arc annulus area (the area through which the gas had to pass in the heater) the size was the same, approximately, as the size of the nozzle throat area. Thus, the gas was required to move at or near sonic velocity at both the arc location and the nozzle throat location. An expected erratic flow was, therefore, obtained. By the addition of a plurality of plasma generators and allowing the gas from them to mix in a plenum, the flow of the gas is made even, as the flow from each arc location is subsonic even though the combined flow at the nozzle throat is sonic.

FIGURES 1 and 2 show the structural location of the six plasma generators 1–6 with respect to the wind tunnel 8. They are arranged in radial array about the plenum 10. Electrical energy, air, and coolant are supplied by appropriate conduits 11 to the plasma generators. The gas is heated by generators 1–6 and then enters a plenum 10 at subsonic velocity where it is thoroughly mixed so that substantially all portions of the plasma have the same temperature. This allows large tolerance in the matching requirements of the plasma generators. The gas discharges from the plenum at or near sonic velocity through the expansion nozzle 12 to the test section 14. A test body 16 is shown positioned inside the test section of the tunnel. The gas is then compressed by the diffuser nozzle 20, flows through valve and heat exchanger 22, and flows into vacuum tank 24.

The tunnel 8 is supported and surrounded by a tank 18 which is actually a large pressure-resistant vessel. Suitable doors and view ports, not shown, are provided in the tank and the tunnel. A plate 26 (see FIGURE 2) is positioned at the back side of plenum 10. Plate 26 has a removable bolt 28 having a viewing port 29 made of suitable transparent material so that one can sight head on to the test object 16. This allows for easier alignment of the test object.

FIGURE 3 illustrates in greater detail the structure of the plasma generators. The plasma generator uses an electric-arc as the gas heater and has an outer cylindrical wall electrode 32 defining a settling chamber 34. A head member 36 is positioned for enclosing the intake side of chamber 34. The head member is secured to wall electrode 32 by conventional means. The wall electrode 32 serves both as a pressure vessel and as an electrode for the generator. The electrodes and head are formed of a conductive metal, such as copper.

A center electrode 40 mounted in head member 36 extends axially into chamber 34. A ceramic insulator 42 and an entrance seal insulator 43 are positioned in the annular region between head 36 and electrode 40. The locking ring 44 secures the insulating members 42 and 43 in place.

Coolant passage 48 is provided for the flow of a coolant, such as water, to cool the generator. The center electrode 40 is provided with coolant passages 52 and 54.

Two coils 56 and 57 which are water cooled magnetic coils are provided to contain the arc within the plasma generator. The arc, of course, is formed between the center electrode 40 and the wall electrode 32. The coils accomplish the containment by a reduction of their magnetic field in the area about the gap 59 between them. This makes an arc see an increasing magnetic field if it heads away from this area of reduced magnetic field; therefore restricting the arc within chamber 34. A coolant from a source, not shown, is passed through the copper tubing making up windings 56 and 57 for dissipating the heat produced by the current flow therein. A sparking device 60, such as a spark plug, is provided for starting the arc at a predictable time.

A suitable gas supply 94, shown in the block diagram of FIGURE 5, is connected through a passage or conduit 62 to chamber 34. More than one conduit may be used according to need. The gas supply will be provided with a regulator such as a ball valve gas regulator. Polynomial gas flow function generators may be provided in place of a ball valve to produce the exponential rate of flow increase required for real time re-entry simulation.

Figure 4:
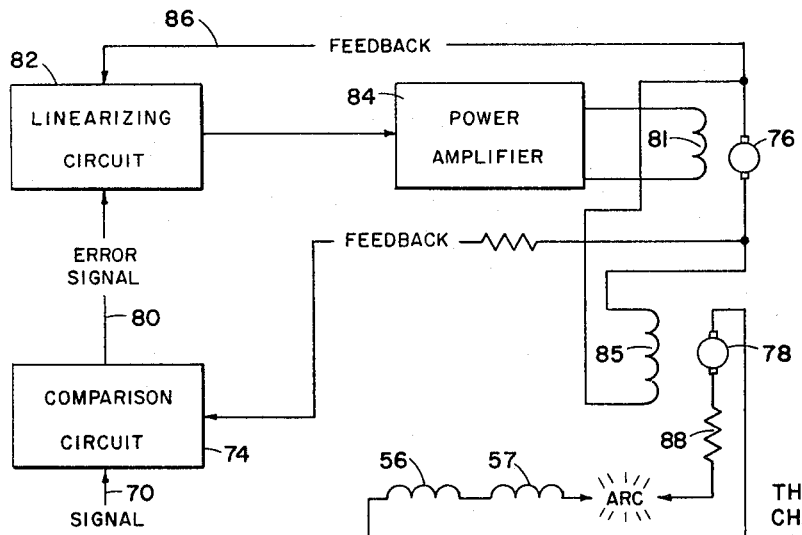
FIGURE 4 shows a schematic diagram illustrating one preferred form of a generator control system according to the present invention.

FIGURE 4 sets forth the control circuit used for each power generator. In the preferred embodiment there are six power generators, one for each plasma generator. A signal 70 from the programmed generator control 72 (see FIGURE 5) enters comparison circuit 74 where it is compared with a feedback signal from the exciter generator 76 (the feedback could have been obtained from the output of the main generator 78). This comparison produces an error signal 80 which is fed to the field winding 81 of the exciter generator 76 by way of linearizing circuit 82 and power amplifier 84. This causes the field current 85 of the main generator—and therefore, the power to the arc of the plasma generator—to follow the function of the signal 70. A minor loop feedback 86 is provided for linearizing circuit 82 so as to hold amplifier 84 within three percent of linear throughout its operation range. A ballast resistor 88 may be inserted in the output circuit of the main generator in order to provide stable loading of the arc.

FIGURE 5 shows the overall block diagram of the invention and will best explain the operation of the invention. The master program control and recorder 90 controls and records the power to the plasma generator, the gas flow rate, and the diffuser. A magnetic driver 92 may be provided to further control the plasma flow. If such a driver were added, it would also be controlled by master program controller 90. Master program control and recorder 90 contains an analog computer which is programmed by the operator so as to control the condition of the gas flowing in the test section 14 to simulate time varying conditions of the operator's choosing.

The conditions which occur during reentry are just such time varying conditions which our simulator can be used to great advantage. The variation of density through the atmosphere encountered by a re-entering body is approximately exponential. The power for simulating reentry, therefore, will also have to vary in the same way. Master program controller 90 will increase exponentially the power output of the generators until the limit of the power generators is reached. The output of the generators may then be held constant for the remainder of the run. The gas flow rate of the gas supply 94 is controlled by a programmed flow control 96 which is controlled by master controller 90. Both the gas flow rate and the power to the plasma generators are varied in accordance to the computer program during a run so as to give a real time reentry simulation.

The master program control and recorder is connected to various points in and about the simulator so as to receive signals therefrom, and a recorder, not shown, is provided to record these signals. A panel, not shown, is also provided to give visual indication of the signals.

The performance of a run starts with the running of the vacuum pumps 98, which brings vacuum tank 24 down near to zero pressure. When inserted the test body is aligned within the test section, the gas supply 94 is made ready, and the power generators are brought up to speed. The system is now in the prerun ready state. The panel of the recorder 90 has a manual start button. Upon pressing of the start button, the master controller automatically controls the simulator to run the preset program, and data is also recorded automatically. However, an emergency cut off button is provided on the panel. The fact that the vacuum tank is at a low pressure at the start of the run and at a higher pressure at the end of the run is taken advantage of in obtaining exponential variation of the density of the gas.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. It will be apparent to those skilled in the art that changes may be made in the form of the apparatus disclosed without departing from the spirit of the invention as set forth in the disclosure, and that in some cases certain features of the invention may sometimes be used to advantage without a corresponding use of other features. It is, therefore, to be understood that within the scope of the appended claims, the invention may be practiced otherwise than as specifically described. The simulator can simulate many more conditions than reentry. Accordingly, it is desired that the scope of the invention be limited only by the appended claims.

We claim:

1. Simulation apparatus comprising a plurality of variable gas driving means each having a gas intake and a gas flow output; first controlling means connected to said variable gas driving means to control same, a variable gas supply means connected to supply each of said gas driving means by way of its gas intake; second controlling means being connected to said variable gas supply means to control same; a mixing chamber means having inputs connected to the gas outputs of each of said variable gas driving means so as to mix the gas flowing therefrom; a utilization device connected to an output of said chamber means to receive the gas flowing therefrom; and a program means connected to said first and second controlling means so as to vary said variable gas driving means and said variable gas supply means in a predetermined manner.

2. Simulation apparatus as set forth in claim 1, wherein said utilization device is a wind tunnel having a test section therein.

3. Simulation apparatus as set forth in claim 2, wherein said program means can be programmed to simulate real time entry of a body into an atmosphere.

4. Simulation apparatus as set forth in claim 3, wherein said gas driving means are plasma generators which heat the gas by means of an electrical arc, said arc being powered by a controllable electrical power source, and wherein said first controlling means is said power source.

5. Simulation apparatus as set forth in claim 4, wherein the gas driving means are designed so as to have a gas flow therefrom which is substantially less than the gas flow in the test section.

6. Simulation apparatus as set forth in claim 5, wherein the gas flow from the gas driving means is at a subsonic velocity and the gas flow from said mixing chamber means is, at least, at a sonic velocity.

References Cited
UNITED STATES PATENTS

| | | |
|---|---|---|
| 2,972,696 | 2/1961 | Kantrowitz et al. |
| 2,992,345 | 7/1961 | Hansen. |
| 3,029,635 | 4/1962 | Fetz _____ 73—147 |
| 3,327,536 | 6/1967 | Fitzgerald _____ 73—147 XR |

DAVID SCHONBERG, *Primary Examiner.*